United States Patent

[11] 3,618,930

| [72] | Inventors | James C. Brandt<br>3153 Stelling Road;<br>Paul A. Brandt, 240 Colorado St., both of<br>Palo Alto, Calif. 94303 |
|---|---|---|
| [21] | Appl. No. | 784,813 |
| [22] | Filed | Dec. 18, 1968 |
| [45] | Patented | Nov. 9, 1971 |

[54] PNEUMATIC PIPE CLAMP
1 Claim, 2 Drawing Figs.

[52] U.S. Cl. .................................................. 269/20
[51] Int. Cl. .................................................. B25b 5/02
[50] Field of Search ....................................... 269/20, 22,
25, 32, 37, 3; 24/263 HW

[56]  References Cited
UNITED STATES PATENTS

| 1,829,180 | 10/1931 | Bailey | 269/22 X |
| 1,430,226 | 9/1922 | Goodreau | 269/27 |
| 2,668,465 | 2/1954 | Kaufman | 269/25 |
| 2,675,699 | 4/1954 | Tilden | 269/25 X |
| 2,711,566 | 6/1955 | Peterson | 269/22 X |
| 2,947,275 | 8/1960 | Edmonds | 269/25 |

Primary Examiner—Andrew R. Juhasz
Assistant Examiner—Z. R. Bilinsky
Attorney—Whittemore, Hulbert & Belknap ABSTRACT: A portable clamp in which one of the clamping jaws is operated by a diaphragm-type fluid actuator, having valve means for automatically closing the fluid inlet to the actuator when the fluid inlet is disconnected from a pressure source to thereby retain clamping pressure on the object clamped.

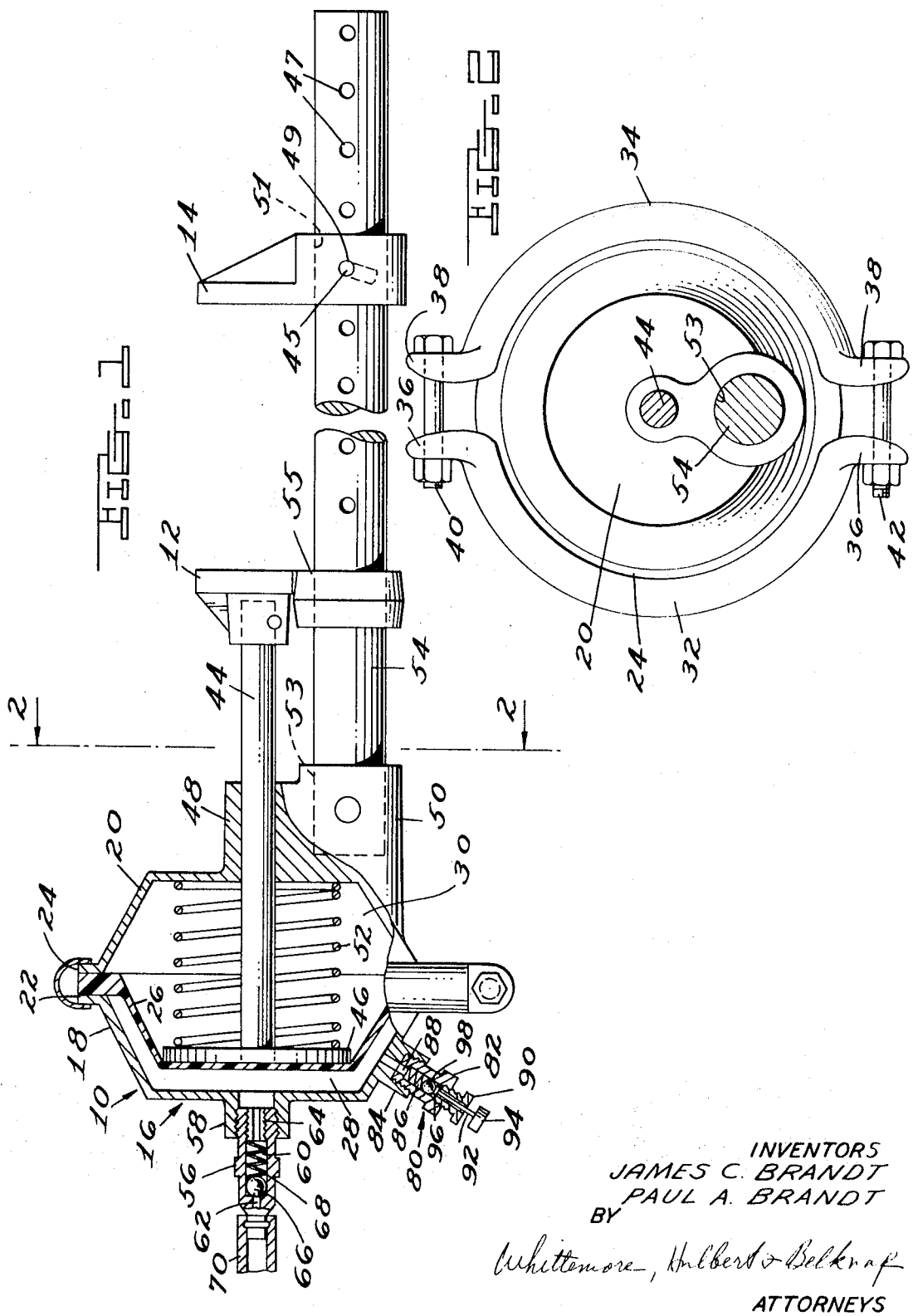

3,618,930

PNEUMATIC PIPE CLAMP

SUMMARY OF THE INVENTION

One object of this invention is to provide a portable pressure-retaining clamp so constructed that the object clamped can be moved from place to place without any loss of clamping pressure.

Another object is to provide a portable clamp having a diaphragm-type pressure actuator.

Another object is to provide a portable clamp having means for adjustably mounting one of the jaws on the pressure actuator.

Another object is to provide an elongated member for mounting one of the jaws on the pressure actuator which is removable and replaceable by another member of a different length.

Another object is to provide a portable clamp having manually operable means for relieving the pressure in the actuator to unclamp the work.

Other objects and features of the invention will become apparent as the description proceeds, especially when taken in conjunction with the accompanying drawing, wherein:

FIG. 1 is an elevational view with parts in section showing a portable clamp embodying our invention.

FIG. 2 is a view taken on the line 2—2 on FIG. 1.

Referring now more particularly to the drawing, the clamp comprises a fluid pressure actuator 10 having a movable jaw 12 and a fixed jaw 14. The actuator 10 comprises a housing 16 defining a chamber, the housing being formed of the two cup-shaped members 18 and 20. These members have annular peripheral flanges 22 and 24 which are opposed to one another and between which is clamped the margin of a flexible diaphragm 26 of rubber or like material extending across the chamber and sealing the two spaces 28 and 30 from one another. The cup-shaped members 18 and 20 are secured together by the arcuate C-shaped members 32 and 34 which embrace and grip the flanges 22 and 24 of the cup-shaped members 18 and 20 and have outwardly turned ends 36 and 38 which face one another and are releasably connected together by the nut and bolt assemblies 40 and 42.

A rod 44 extends axially with respect to the actuator housing 16 and has a flat round disc 46 secured to its inner end within space 30 and bearing centrally against one side of diaphragm 26. The rod 44 extends through the end wall of the cup-shaped housing member 20 and is axially slidably supported in a bearing sleeve 48 of the boss or fitting 50 which may be secured to or formed integrally with the cup-shaped housing member 20. The jaw 12 is secured in fixed position on the outer end of rod 44. A compression coil spring 52 within space 30 bears against the base of the cup-shaped member 20 and against disc 46 to urge rod 44 and diaphragm 26 leftward in FIG. 1 to the retracted position shown.

The boss or fitting 50 has a threaded socket 53 in which one end of the rod or pipe 54 is screwed. The pipe 54 has the jaw 14 secured to the outer end thereof. The jaw 14 may be longitudinally adjustably mounted on rod 54 or it may be mounted permanently in fixed position. As shown, jaw 14 has a hole 51 through which pipe 54 extends, and transverse passages 49 in the jaw can be aligned with any of the transverse passages 47 in pipe 54 and a pin 45 slipped into the aligned passages to secure the jaw 14 in adjusted position. Obviously other means for securing the jaw 14 in longitudinally adjusted position may be employed. The pipe 54 is substantially parallel to the rod 44 and the jaws 12 and 14 are opposed to one another so that when the jaw 12 is advanced to the right in FIG. 1 an object may be clamped between the jaws. The jaw 12 has an annular extension 55 which slides on pipe 54 to keep jaw 12 from turning.

The cup-shaped member 18 has means providing an inlet for fluid pressure to the space 28. As shown in FIG. 2, a fitting 56 is threaded into an extension 58 of the base of the cup-shaped member 18 and has a cylindrical chamber 60 communicating with an air inlet passage 62 of reduced cross section at one end of chamber 60 and with the interior space 28 of the actuator through the reduced passage formed in a member 64 threaded into the opposite end of chamber 60. A ball 66 in chamber 60 is normally urged by spring 68 to closed position covering inlet passage 62 so that the charge of air in space 28 will be retained even though the clamp is separated from the source of air pressure, such as airhose 70. When the source of air pressure is connected to the inlet 62 obviously the ball 66 is displaced from its closed position and air under pressure is introduced to the space 28.

A relief valve 80 is provided for the manual release of pressure in space 28. As shown in FIG. 2, a fitting 82 is threaded into an extension 84 of the cup-shaped member 18 and has a cylindrical chamber 86 communicating with the space 28 through a reduced passage 88 in the fitting 82 and a passage in the base of the extension 84. A tubular fitting 90 is threaded into the outer end of the fitting 82.

A valve element 92 extends through the tubular fitting 90 having an operating button 94 on the outer end and a head 96 on the inner end which is engageable with the inner end of the tubular fitting to close the passage through the tubular fitting and prevent the escape of air from the space 28. A spring-pressed ball 98 in the chamber normally urges the head 96 of the pin toward the closed position as shown in FIG. 1. However, when it is desired to relieve the pressure of air in space 28 the button 94 is depressed to lift the valve element head 96 against the pressure of the ball to open the passage through the tubular extension 90.

In operation, and assuming little if any air pressure in space 28, the spring 52 will normally retract the diaphragm and the jaw 12 to the position shown in FIG. 1. When an airhose is applied to the fitting 56, the space 28 is pressurized and the diaphragm is moved to the right against the pressure of spring 52 causing jaw 12 to approach jaw 14 and clamp the work. When the airhose 70 is disconnected from the fitting 56, ball 66 is spring urged to closed position automatically sealing the space 28 and retaining the pressure therein.

The clamp is obviously portable and the clamped object can be moved about from place to place without any loss of clamping pressure. When it is desired to release the object, the relief valve 80 may be operated by the manual button 94 to retract the diaphragm and the movable jaw 12.

The clamp is adjustable by means of the threaded connection between rod 54 and the boss 50 whereby the rod 54 may be threaded in and out for limited longitudinal adjustment of the clamp 14. For larger adjustments, the jaw 14 may itself be moved longitudinally upon the rod 54 and reclamped on the rod in longitudinally adjusted position, or the rod 54 may be replaced by another rod of different length.

What we claim as our invention is:

1. A portable clamp for gripping an object and moving the same unrestrained from place to place without loss of clamping pressure, comprising an actuator having a housing defining a chamber, a flexible diaphragm within and extending across said chamber dividing the same into two fluid spaces, means sealing said diaphragm around its periphery to said housing to seal said spaces from one another, a rod normal to said diaphragm having a head in one of said spaces in operative engagement with said diaphragm and extending outside said housing through a wall thereof, an elongated member secured to said housing and extending outside said housing in substantially parallel relation with said rod, said rod and said elongated member having jaws opposed to one another outside said housing, a fluid inlet to the other of said spaces connectable to a source of fluid under pressure to introduce the fluid under pressure and move said diaphragm in one direction toward said rod, said rod being axially movable with and in response to the aforesaid movement of said diaphragm to cause the jaw thereon to approach the other jaw in clamping relation, valve means for automatically closing said fluid inlet when disconnected from the pressure source to retain the pressure in said other space so that said clamp and an object gripped by said clamp may thereupon be moved unrestrained from place to place under full clamping pressure, manually operable valve means on said housing for relieving the pressure in said other space, and a spring in said one-space bearing upon said rod head to move said diaphragm in the opposite direction and retract said rod and the jaw thereon when the pressure in said other space is relieved.

\* \* \* \* \*